US012500341B2

(12) United States Patent
Hamabe

(10) Patent No.: US 12,500,341 B2

(45) Date of Patent: Dec. 16, 2025

(54) ANTENNA DEVICE AND COMMUNICATION DEVICE

(71) Applicant: Panasonic Intellectual Property Management Co., Ltd., Osaka (JP)

(72) Inventor: Taichi Hamabe, Osaka (JP)

(73) Assignee: PANASONIC INTELLECTUAL PROPERTY MANAGEMENT CO., LTD.., Osaka (JP)

( * ) Notice: Subject to any disclaimer, the term of this patent is extended or adjusted under 35 U.S.C. 154(b) by 199 days.

(21) Appl. No.: 18/207,863

(22) Filed: Jun. 9, 2023

(65) Prior Publication Data

US 2023/0402753 A1 Dec. 14, 2023

(30) Foreign Application Priority Data

Jun. 10, 2022 (JP) ................................ 2022-094626

(51) Int. Cl.

*H01Q 5/378* (2015.01)
*H01Q 7/00* (2006.01)

(52) U.S. Cl.

CPC ............... *H01Q 5/378* (2015.01); *H01Q 7/00* (2013.01)

(58) Field of Classification Search

CPC ........ H01Q 5/378; H01Q 7/00; H01Q 1/2291; H01Q 9/40; H01Q 5/385

See application file for complete search history.

(56) References Cited

U.S. PATENT DOCUMENTS

| | | | | |
|---|---|---|---|---|
| 11,245,188 B2 * | 2/2022 | Chiang | .................... | H01Q 9/26 |
| 2023/0163466 A1 * | 5/2023 | Yu | ............................ | H01Q 9/42 343/702 |

FOREIGN PATENT DOCUMENTS

| | | |
|---|---|---|
| JP | 2005-20289 | 1/2005 |
| JP | 4976511 | 7/2012 |
| WO | 2021/213125 | 10/2021 |

OTHER PUBLICATIONS

Extended European Search Report issued Oct. 11, 2023 in corresponding European Patent Application No. 23159556.2.

K. Sakaguchi et al., "A Small Antenna Consisting of Short-Ended Parallel Stubs and Capacitors", Electronics and Communications in Japan, Part 1., vol. 80, No. 4, pp. 83-95, Nov. 4, 1997.

* cited by examiner

*Primary Examiner* — Minh Tran

(74) *Attorney, Agent, or Firm* — Wenderoth, Lind & Ponack, L.L.P.

(57) ABSTRACT

There are provided an antenna device and a communication device including: a feed antenna connected to a feed point and extending from the feed point, the feed antenna corresponding to a first frequency; a loop antenna connected to a ground and arranged to surround the feed antenna, the loop antenna corresponding to a second frequency lower than the first frequency; and a resonator arranged outside the loop antenna in a direction in which the feed antenna extends, the resonator corresponding to the second frequency. The loop antenna includes an extending portion that extends to protrude outward on a side where the resonator is arranged with respect to the feed point.

4 Claims, 4 Drawing Sheets

ANTENNA DEVICE AND COMMUNICATION DEVICE

CROSS-REFERENCE TO RELATED APPLICATIONS

This application is based on and claims priority under 35 USC 119 from Japanese Patent Application No. 2022-094626 filed on Jun. 10, 2022, the contents of which are incorporated herein by reference.

TECHNICAL FIELD

The present disclosure relates to an antenna device and a communication device.

BACKGROUND ART

In the related art, it is required to extend a frequency that an antenna can apply to a frequency in a wider band. For example, in Wi-Fi 6 among Wi-Fi (registered trademark) which is a wireless communication technology in the related art, an antenna applicable to a 2400 MHz band and a 5000 MHz band is known. JP2005-020289A discloses a configuration in which a loop antenna corresponding to a plurality of frequency bands is provided in one antenna to allow resonance, and the size of the entire antenna device is reduced.

SUMMARY OF INVENTION

The present disclosure has been devised in view of the above circumstances in the related art, and an object thereof is to provide an antenna device capable of corresponding to a plurality of frequency bands and reducing the size.

According to an illustrative aspect of the present disclosure, an antenna device includes: a feed antenna connected to a feed point and extending from the feed point, the feed antenna corresponding to a first frequency; a loop antenna connected to a ground and arranged to surround the feed antenna, the loop antenna corresponding to a second frequency lower than the first frequency; and a resonator arranged outside the loop antenna in a direction in which the feed antenna extends, the resonator corresponding to the second frequency. The loop antenna includes an extending portion that extends to protrude outward on a side where the resonator is arranged with respect to the feed point.

According to another illustrative aspect of the present disclosure, a communication device includes the antenna device according to the above aspect.

Any combination of the above components or a conversion on the expression of the present disclosure between devices, systems, or the like is also effective as an aspect of the present disclosure.

According to the present disclosure, it is possible to provide an antenna device capable of corresponding to a plurality of frequency bands and reducing the size.

DESCRIPTION OF EMBODIMENTS

Background of Present Disclosure

In the related art, an antenna device capable of corresponding to a plurality of frequency bands is known. For example, in Wi-Fi (registered trademark) which is one of wireless communication technologies, there is an antenna device including a configuration capable of corresponding to two frequency bands including a 2 GHz band and a 5 GHz band. In such an antenna device, for example, a 2 GHz antenna of λ/2 is formed, and a dual mode is formed by resonating at λ for a 5 GHz antenna. In addition, a dual mode may be formed by combining 2 GHz and 5 GHz. Here, in the antenna device, when either an element length of an element for 2 GHz or an element length of an element for 5 GHz is changed, the respective frequency characteristics will be affected.

In addition, further extension of the band to which the antenna device is applicable will be required in the future, and the number of elements constituting the antenna device will increase in accordance with the extension. Further, in order to improve the strength of the antenna device itself or to install the antenna device, various metal structures exist around the antenna device. It is necessary to secure a certain distance from the metal structures of the elements constituting the antenna device according to the corresponding frequency. For example, in the case of the 5 GHz band, it is necessary to secure a distance of about 15 mm from the metal structure. Taking these into consideration, in order to corresponding to a plurality of frequency bands, it is required to compact the antenna size while sharing the elements in the antenna device as much as possible.

Hereinafter, embodiments specifically disclosing an antenna device and a communication device according to the present disclosure will be described in detail with reference to the accompanying drawings as appropriate. An unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for those skilled in the art to fully understand the present disclosure, and are not intended to limit the subject matter described in the claims.

First Embodiment

In a first embodiment to be described below, an antenna device capable of performing wireless communication conforming to a wireless local area network (LAN) standard of Wi-Fi (registered trademark) using a frequency in a 2.4 GHz band (for example, 2400 MHz to 2500 MHz) and a frequency in a 5 GHz band (for example, 5150 MHz to 5800 MHz) as operating frequencies will be described as an example. The antenna device is not limited to the above standard, and may be applied to wireless communication in a frequency band conforming to another standard.

[Device Configuration]

Figure 1:
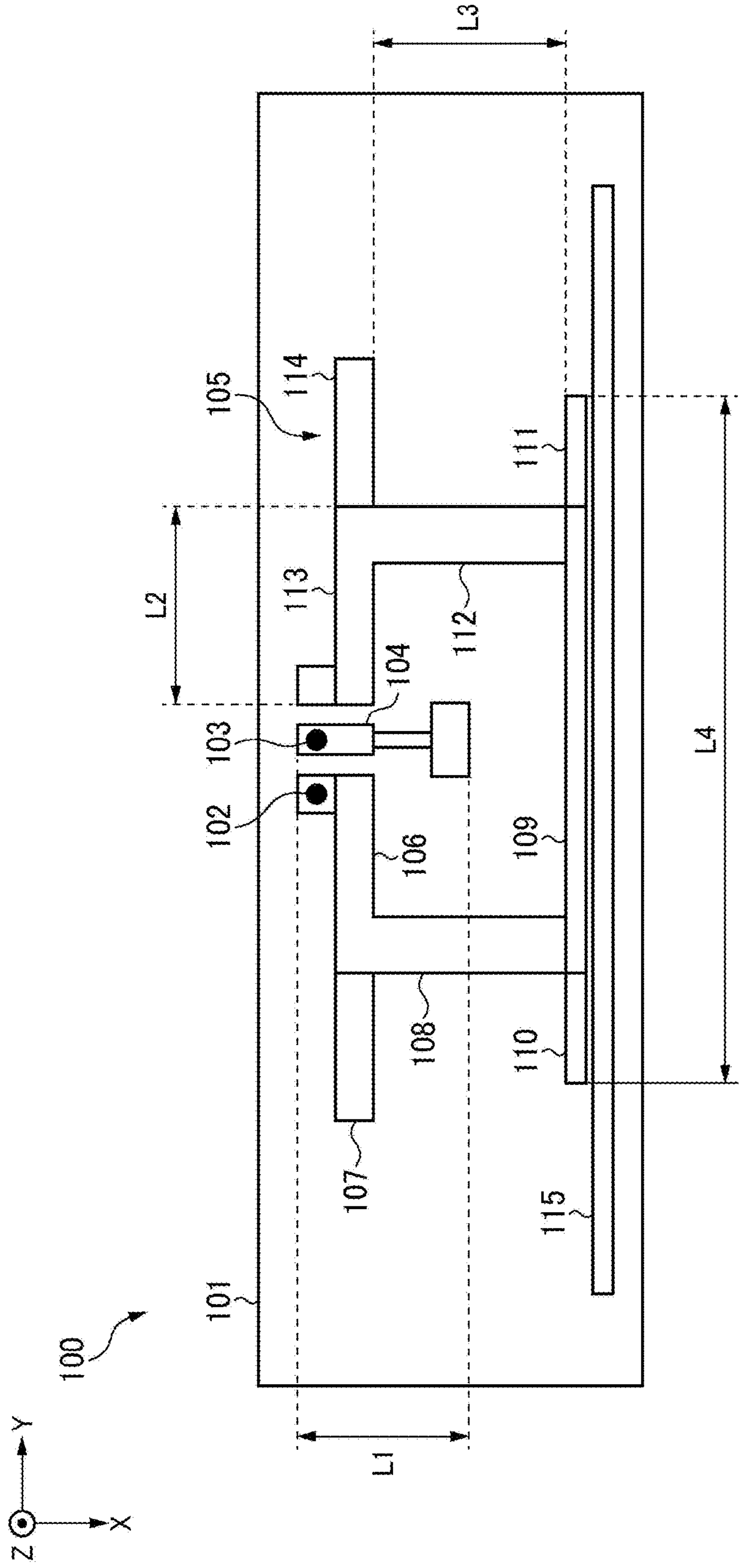
FIG. 1 is a diagram showing a configuration example of an antenna device according to a first embodiment.

FIG. 1 is a schematic diagram showing a configuration example of an antenna device 100 according to the present embodiment. In FIG. 1, an X axis corresponds to a lateral direction of a board 101 on which the antenna device 100 is configured. A Y axis corresponds to a longitudinal direction of the board 101 on which the antenna device 100 is configured. A Z axis corresponds to a thickness direction of the board 101 of the antenna device 100.

The antenna device 100 is mounted on, for example, a communication device (not shown) capable of using wireless communication of Wi-Fi (registered trademark). Therefore, the communication device can perform wireless communication with another communication device using the antenna device 100 in a plurality of frequency bands including a 2 GHz band and a 5 GHz band.

The board 101 of the antenna device 100 according to the present embodiment has a rectangular shape. The shape and the size of the board 101 are not particularly limited, and it is desirable that the board 101 include elements to be described later and have a shape and size in consideration of the influence of a metal structure located in the periphery. The board 101 may be a laminated board including a plurality of layers.

In the antenna device 100 according to the present embodiment, the elements constituting the antenna are formed on a printed wiring board which is a laminated board including a plurality of layers, and a pattern is formed by etching a metal foil on the surface. Each of the plurality of layers may be made of, for example, copper foil, glass epoxy, or the like.

The board 101 includes an antenna conductor 104 as an example of a feed antenna and an antenna conductor 105 as an example of a parasitic antenna. The antenna conductor 104 is provided with a feed point 103 for feeding. The feed point 103 is connected to a power source (not shown) via, for example, a conductive wire (not shown). The antenna conductor 105 is provided with a ground point 102 for connecting (short-circuiting) to the ground (GND). The ground point 102 is connected to a ground level via, for example, a conductive wire (not shown). The conductive wires connected to the ground point 102 and the feed point 103 may be included in one coaxial cable (not shown).

In the present embodiment, for the 5 GHz band which is an example of a first frequency, resonance is caused by the antenna conductor 104. In addition, for the 2 GHz band which is an example of a second frequency lower than the first frequency, resonance is caused by a loop antenna of the antenna conductor 105. Therefore, dimensions of portions constituting the antenna are defined to correspond to these frequency bands.

The antenna conductor 104 extends from the feed point 103 such that a length in the longitudinal direction (X-axis direction in FIG. 1) is λ/4. Here, the length of the antenna conductor is indicated by L1. λ indicates the frequency, and in the present embodiment, L1 is defined to correspond to the 5 GHz band. That is, an element length in the longitudinal direction of the antenna conductor 104 is set to ¼ of the wavelength in the 5 GHz band.

The antenna conductor 105 is arranged so as to surround the antenna conductor 104, and is configured as the loop antenna. In the present embodiment, an example is shown in which the antenna conductor 105 has a rectangular shape around the antenna conductor 104. When viewed along the Z axis in FIG. 1, the antenna conductor 105 includes an element portion 106, an element portion 108, an element portion 109, an element portion 112, and an element portion 113 in a counterclockwise direction from the ground point 102. The element portion 106 is provided along a Y-axis direction. In addition, an extending portion 107 is provided so as to extend from the element portion 106 along the Y-axis direction.

The element portion 108 is provided along the X-axis direction, and is connected to the element portion 106 and the element portion 108. The element portion 112 is provided along the X-axis direction and is connected to the element portion 113 and the element portion 109. The element portion 109 is provided along the Y axis, and extending portions 110 and 111 extending along the Y axis are provided at both ends of the element portion 109.

The element portion 113 is provided along the Y-axis direction. In addition, an extending portion 114 is provided so as to extend from the element portion 113 along the Y-axis direction. In the present embodiment, the element portions 106 and 113 and the extending portions 107 and 114 are located on a straight line along the Y-axis direction. In addition, the extending portions 107 and 114 are parallel to the extending portions 110 and 111.

In addition, an antenna conductor 115 is further provided so as to be parallel to the element portion 109 along the Y axis.

The antenna conductor 105 is configured such that the sum of lengths of the element portion 106, the element portion 108, the element portion 109, the element portion 112, and the element portion 113 is λ. That is, the sum of the element lengths of the antenna conductor 105 is the wavelength λ in the 2 GHz band. Here, the length of the element portions 106 and 113 in the Y-axis direction is indicated by L2. In addition, the length of the element portions 108 and 112 in the lateral direction is indicated by L3. In addition, the sum of the lengths of the element portion 109 and the extending portions 110 and 111 in the Y-axis direction is indicated by L4. In this case, for example, L2 can be configured to be λ/8, L3 can be configured to be λ/8, and L4 can be configured to be λ/2. In the present embodiment, L2, L3, and L4 are defined to correspond to the 2 GHz band.

The extending portions 107 and 114 are elements for adjustment for impedance matching, and can be optionally set. The extending portions 107 and 114 are located on a feed point 103 side in the antenna conductor 105 constituting the loop antenna. On the other hand, the extending portions 110 and 111 are located on an antenna conductor 115 side with respect to the feed point 103 in the antenna conductor 105 constituting the loop antenna.

The antenna conductor 115 is a resonator used to adjust a gain in a predetermined frequency band, and is used to increase a gain in a 2 GHz band, which is an example of the second frequency, in the present embodiment. In the present embodiment, the length of the antenna conductor 115 in the longitudinal direction (Y-axis direction in FIG. 1) is set to be longer than the sum of the lengths of the element portion 109 and the extending portions 110 and 111 in the Y-axis direction.

[Resonance]

Figure 2A:
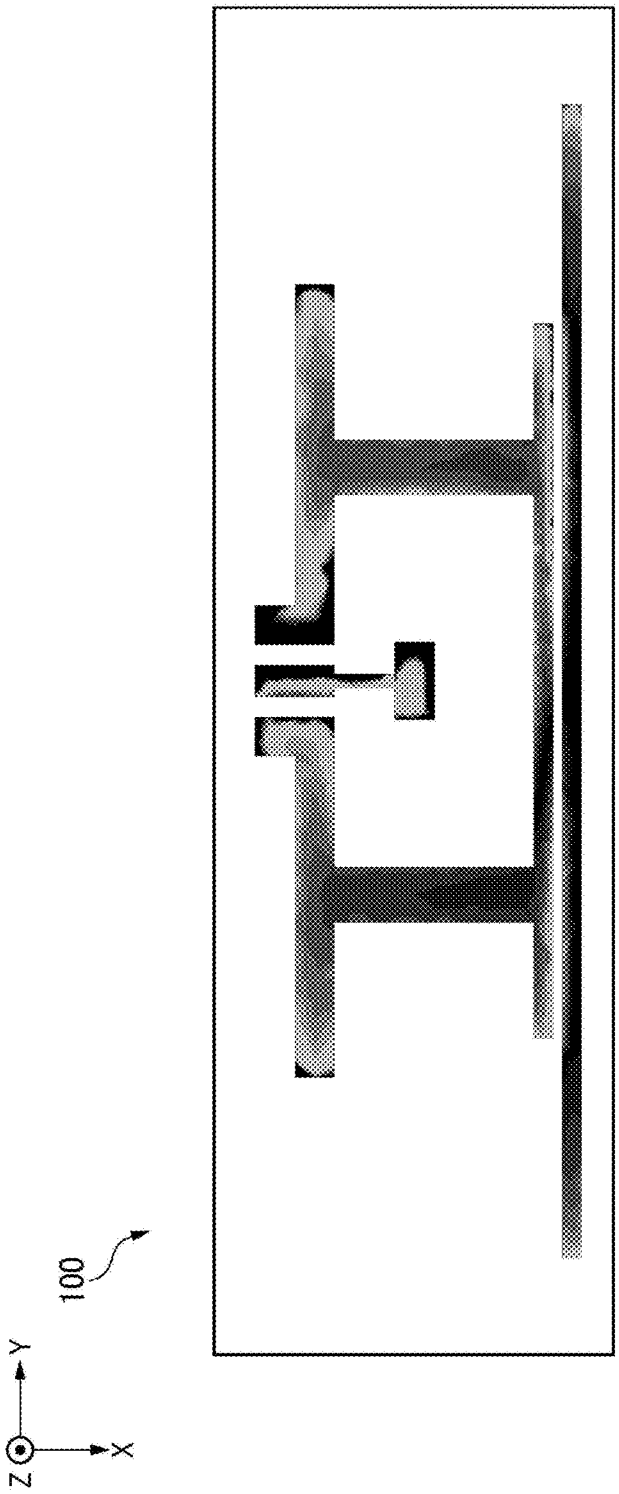
FIG. 2A is a diagram for describing a resonance state of the antenna device according to the first embodiment.
Figure 2B:
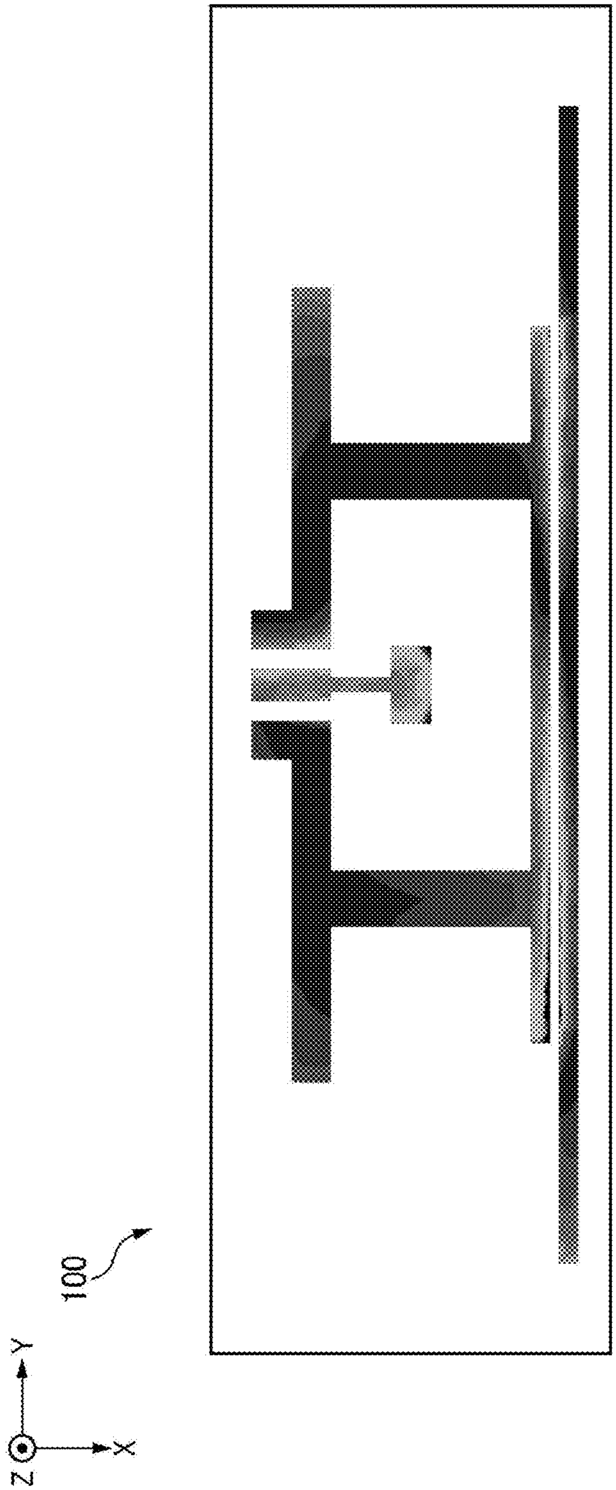
FIG. 2B is a diagram for describing a resonance state of the antenna device according to the first embodiment.

FIGS. 2A and 2B are diagrams showing examples of resonance states in the 2 GHz band and the 5 GHz band in the configuration of the antenna device 100 according to the present embodiment shown in FIG. 1. Here, the resonance state is indicated by gradation.

FIG. 2A is a diagram showing an example of the resonance state in the 2 GHz band. As described above, for the 2 GHz band, resonance is caused using the loop antenna of the antenna conductor 105.

FIG. 2B is a diagram showing an example of the resonance state in the 5 GHz band. As described above, for the 5 GHz band, resonance is caused using the antenna conductor 104. As shown in FIGS. 2A and 2B, a portion to be resonated is different depending on a corresponding frequency band.

[VSWR Characteristics]

Figure 3A:
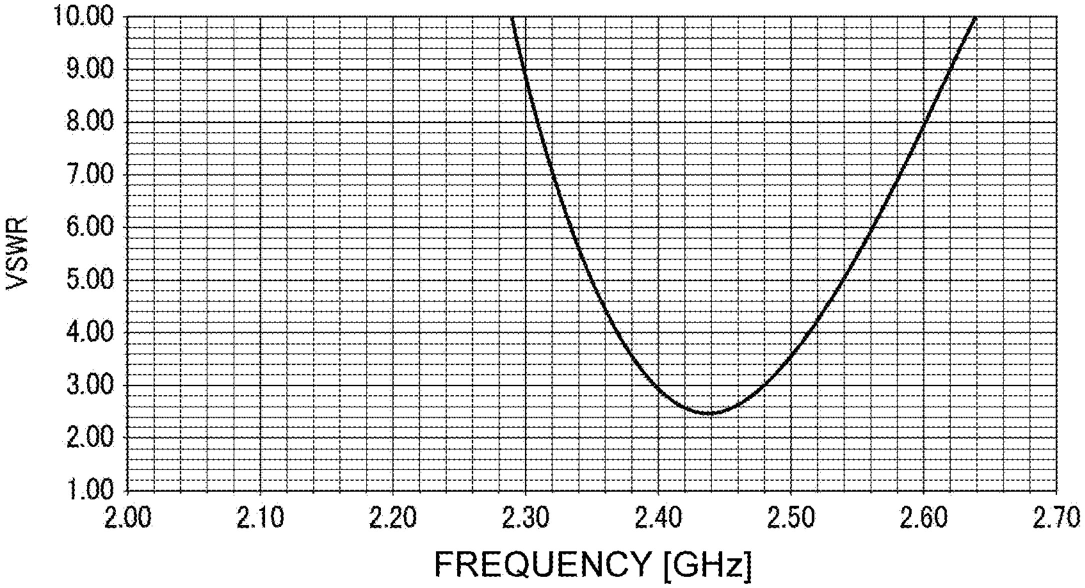
FIG. 3A is a graph showing VSWR characteristics of the antenna device according to the first embodiment.
Figure 3B:
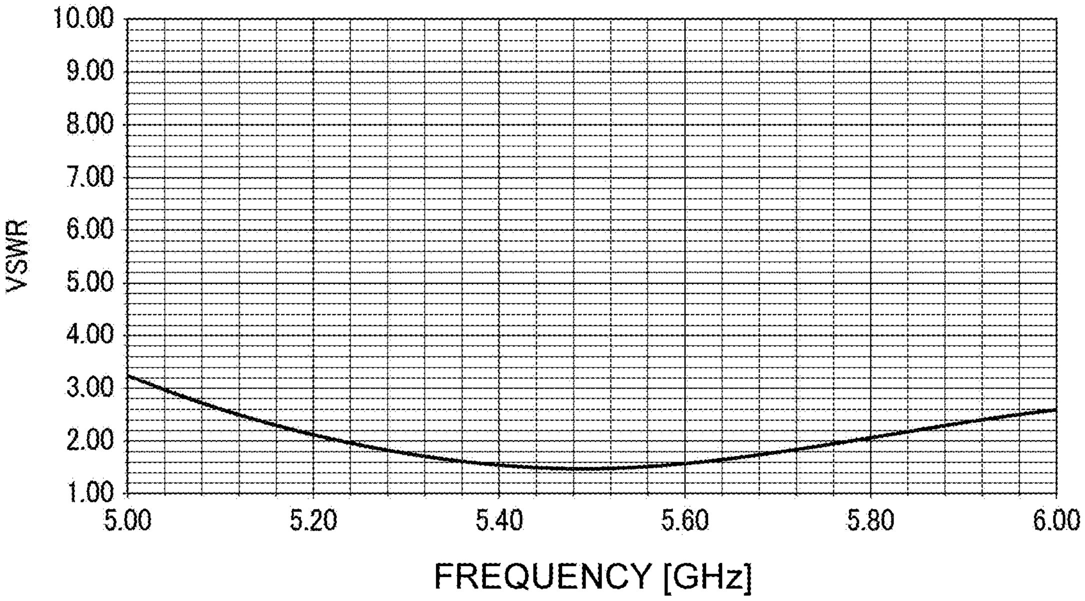
FIG. 3B is a graph showing VSWR characteristics of the antenna device according to the first embodiment.

FIGS. 3A and 3B are graphs showing voltage standing wave ratio (VSWR) characteristics for 2 GHz band and 5 GHz band in the configuration of the antenna device 100 according to the present embodiment shown in FIG. 1. In FIGS. 3A and 3B, a horizontal axis indicates frequency [GHz], and a vertical axis indicates VSWR.

FIG. 3A shows VSWR characteristics in a resonance mode for the 2 GHz band. In FIG. 3A, focusing on the 2 GHz band (for example, 2.40 GHz to 2.50 GHz), the VSWR shows a minimum value of about 2.4.

FIG. 3B shows VSWR characteristics in a resonance mode for the 5 GHz band. In FIG. 3B, focusing on the 5 GHz band (for example, 5.15 GHz to 5.80 GHz), the VSWR shows a value of 3 or less and shows a minimum value of about 2.5.

As described above, according to the present embodiment, the antenna device 100 includes a feed antenna (antenna conductor 104) corresponding to a first frequency (for example, 5 GHz band), connected to the feed point 103, and extending from the feed point 103, a loop antenna (antenna conductor 105) corresponding to a second frequency (for example, 2 GHz band) lower than the first frequency, connected to the ground point 102, and arranged so as to surround the feed antenna (antenna conductor 104), and a resonator (antenna conductor 115) corresponding to the second frequency and arranged outside the loop antenna (antenna conductor 105) in a direction in which the feed antenna (antenna conductor 104) extends. The loop antenna (antenna conductor 105) includes the extending portions 110 and 111 extending so as to protrude outward on a side where the resonator (antenna conductor 115) is arranged with respect to the feed point 103.

Accordingly, it is possible to provide an antenna device capable of corresponding to a plurality of frequency bands and reducing the size.

In addition, the extending portions 110 and 111 extend so as to be parallel to the longitudinal direction of the resonator (antenna conductor 115).

Accordingly, the antenna device 100 can improve the gain of the second frequency.

In addition, the two extending portions 110 and 111 are provided, and the extending portions 110 and 111 are arranged so as to extend on a straight line.

Accordingly, the antenna device 100 can reduce the size of the inside of the loop antenna (antenna conductor 105) without changing the element length.

In addition, an element length of the feed antenna (antenna conductor 104) is ¼ of a wavelength of the first frequency (for example, 5 GHz), an element length of the loop antenna (antenna conductor 105) is a wavelength of the second frequency (for example, 2 GHz), and an element length of a portion parallel to the resonator (antenna conductor 115) is ½ of the wavelength of the second frequency (for example, 2 GHz), the portion including the extending portions 110 and 111 and a part of the loop antenna (element portion 109).

Accordingly, the antenna device 100 can improve the gain of the second frequency.

In addition, the antenna device 100 can be used by being mounted on various communication devices.

Other Embodiments

Although various embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments described above may be combined optionally in the range without deviating from the spirit of the invention.

In the above embodiments, an example in which the antenna device 100 is mounted in the seat monitor installed in the aircraft has been described. However, the present invention is not limited to the seat monitor, and may be mounted on, for example, many Internet of things (IoT) devices such as a parent device or a child device of a cordless telephone, an electronic shelf label (for example, a card-type electronic device which is attached to a display shelf of a retail store and displays a sales price of a product), a smart speaker, an in-vehicle device, a microwave oven, or a refrigerator.

In addition, the antenna device according to the present invention may be applied to, for example, an antenna device dedicated to transmission or reception, in addition to an antenna device capable of transmitting and receiving electromagnetic waves.

What is claimed is:

1. An antenna device comprising:

a feed antenna connected to a feed point and extending from the feed point, the feed antenna corresponding to a first frequency;

a loop antenna connected to a ground and arranged to surround the feed antenna, the loop antenna corresponding to a second frequency lower than the first frequency; and a resonator arranged outside the loop antenna in a direction in which the feed antenna extends, the resonator corresponding to the second frequency, wherein the loop antenna includes an extending portion that extends to protrude outward on a side where the resonator is arranged with respect to the feed point, the extending portion extends parallel to a longitudinal direction of the resonator, an element length of the feed antenna is ¼ of a wavelength of the first frequency, an element length of the loop antenna is a wavelength of the second frequency, and an element length of a portion parallel to the resonator is ½ of the wavelength of the second frequency, the portion including the extending portion and a part of the loop antenna.

2. The antenna device according to claim 1, wherein the extending portion includes two extending portions, and the two extending portions are arranged to extend on a straight line.

3. The antenna device according to claim 1, wherein the first frequency is in a 5 GHz band, and the second frequency is in a 2 GHz band.

4. A communication device comprising:

the antenna device according to claim 1.

* * * * *